(12) United States Patent
Mo et al.

(10) Patent No.: US 9,355,286 B2
(45) Date of Patent: May 31, 2016

(54) PASSIVE RADIO FREQUENCY IDENTIFICATION (RFID) READER, PASSIVE RFID TAG, AND TRANSMITTING AND RECEIVING METHODS USING EXTENDED PULSE-INTERVAL ENCODING (PIE)

(71) Applicant: Electronics and Telecommunications Research Institute, Daejeon-si (KR)

(72) Inventors: Sang Hyun Mo, Daejeon-si (KR); Hyun Seok Kim, Jeonju-si (KR); Kyu Won Han, Daejeon-si (KR); Jae Young Jung, Daejeon-si (KR); Chan Won Park, Daejeon-si (KR); Hyung Chul Park, Seoul (KR); Cheol Sig Pyo, Daejeon-si (KR)

(73) Assignee: ELECTRONICS AND TELECOMMUNICATIONS RESEARCH INSTITUTE, Daejeon-Si (KR)

( * ) Notice: Subject to any disclaimer, the term of this patent is extended or adjusted under 35 U.S.C. 154(b) by 0 days.

(21) Appl. No.: 14/558,129

(22) Filed: Dec. 2, 2014

(65) Prior Publication Data
US 2015/0161420 A1    Jun. 11, 2015

(30) Foreign Application Priority Data

Dec. 5, 2013 (KR) .......... 10-2013-0150885
Nov. 18, 2014 (KR) .......... 10-2014-0160991

(51) Int. Cl.
G06K 7/10       (2006.01)
G06K 19/07      (2006.01)
G06K 19/073     (2006.01)
H04L 25/49      (2006.01)

(52) U.S. Cl.
CPC ........ *G06K 7/10198* (2013.01); *G06K 7/10297* (2013.01); *G06K 19/073* (2013.01); *G06K 19/0723* (2013.01); *H04L 25/4902* (2013.01)

(58) Field of Classification Search
CPC ............ G06K 7/0008; G06K 7/10198; G06K 19/0725; H03M 5/08; H04Q 2209/47; H04L 25/4902
See application file for complete search history.

(56) References Cited

U.S. PATENT DOCUMENTS

| 7,561,624 | B2 | 7/2009 | Fonseka et al. |
| 2006/0109917 | A1 | 5/2006 | Fonseka et al. |
| 2006/0261956 | A1* | 11/2006 | Sundstrom ......... G06K 19/0723 340/572.2 |
| 2010/0314452 | A1 | 12/2010 | Yeo et al. |

FOREIGN PATENT DOCUMENTS

KR    10-2008-0050907 A    6/2008

* cited by examiner

*Primary Examiner* — Curtis Odom
(74) *Attorney, Agent, or Firm* — Rabin & Berdo, P.C.

(57) ABSTRACT

An extended Pulse-Interval Encoding (PIE) modulating method in a Radio Frequency IDentification (RFID) system, wherein the method modulates 2-bit transmitted data and comprises: adjusting a length of a symbol according to a value of the first bit of the transmitted data; and adjusting a length of an energy transfer waiting section according to a value of the second bit of the transmitted data.

20 Claims, 16 Drawing Sheets

FIG. 1C

| Tari | Parameter | Symbol | Minimum | Nominal | Maximum | Units |
|---|---|---|---|---|---|---|
| 6.25 μs to 12 μs | Modulation Depth | (A-B)/A | 80 | 90 | 100 | % |
| | RF Envelope Ripple | $M_h = M_l$ | 0 | | 0.05(A-B) | V/m or A/m |
| | RF Envelope Rise Time | $t_{r, 10-90\%}$ | 0 | | 0.33Tari | μs |
| | RF Envelope Fall Time | $t_{f, 10-90\%}$ | 0 | | 0.33Tari | μs |
| | RF Pulsewidth | PW | MAX(0.265Tari, 2) | | 0.525Tari | μs |

FIG. 3B

| index | payload | | | | | dummy | crc-m | | | | End-of-signaling |
|---|---|---|---|---|---|---|---|---|---|---|---|
| | n-1 | n-2 | ... | 1 | 0 | | m-1 | m-2 | ... | 0 | |
| n : odd  m : 16 | D[n-1] | D[n-2] | ... | D[1] | D[0] | dummy bit 0 | C[m-1] | C[m-2] | ... | C[0] | Sym-0 |
| n : odd  m : 5 | D[n-1] | D[n-2] | ... | D[1] | D[0] | NONE | C[m-1] | C[m-2] | ... | C[0] | Sym-2 |
| n : even  m : 16 | D[n-1] | D[n-2] | ... | D[1] | D[0] | NONE | C[m-1] | C[m-2] | ... | C[0] | Sym-2 |
| n : even  m : 5 | D[n-1] | D[n-2] | ... | D[1] | D[0] | dummy bit 0 | C[m-1] | C[m-2] | ... | C[0] | Sym-0 |

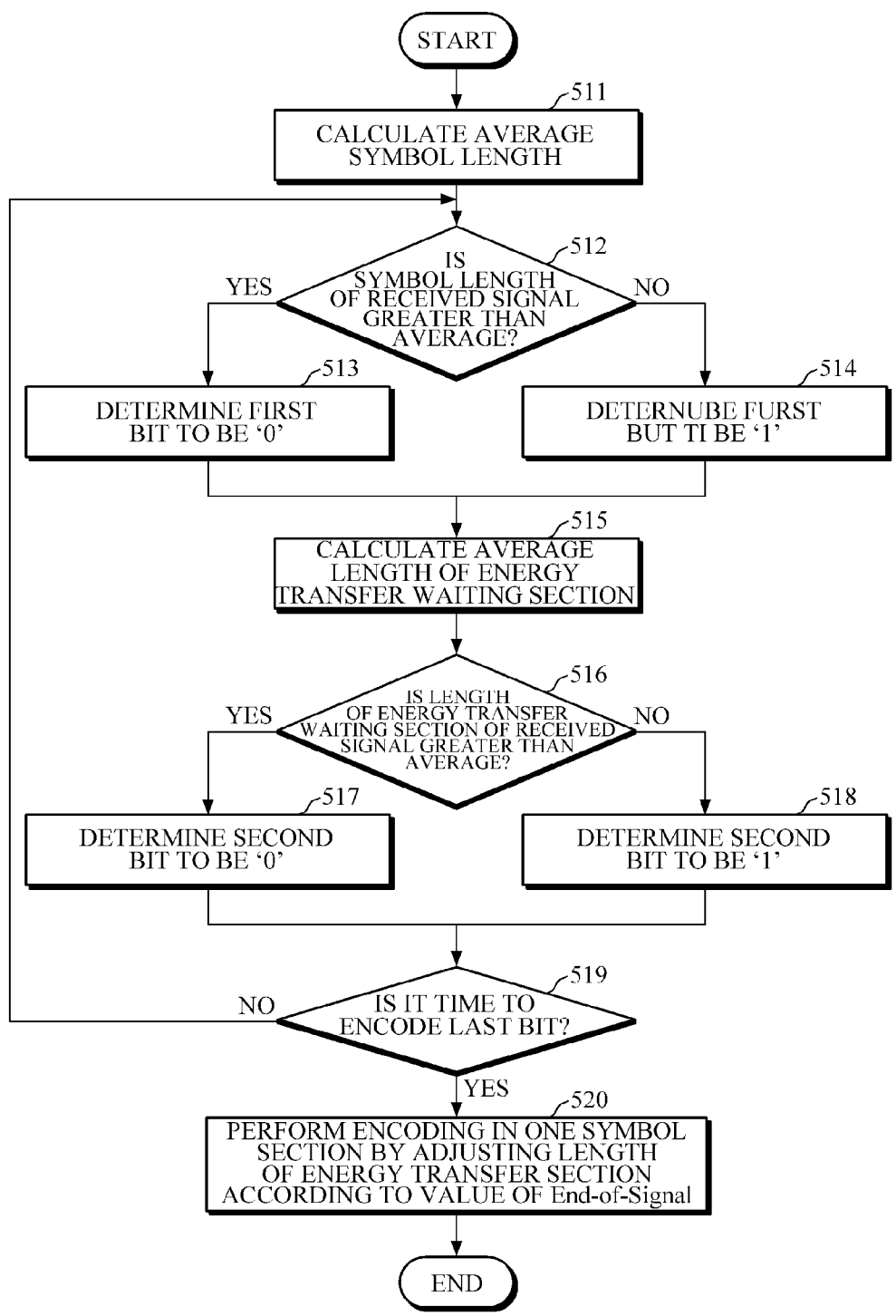

PASSIVE RADIO FREQUENCY IDENTIFICATION (RFID) READER, PASSIVE RFID TAG, AND TRANSMITTING AND RECEIVING METHODS USING EXTENDED PULSE-INTERVAL ENCODING (PIE)

CROSS-REFERENCE TO RELATED APPLICATION(S)

This application claims priority from Korean Patent Application Nos. 10-2013-0150885, filed on Dec. 5, 2013, and 10-2014-0160991, filed Nov. 18, 2014, in the Korean Intellectual Property Office, the entire disclosures of which are incorporated herein by reference for all purposes.

BACKGROUND

1. Field

The following description relates to a passive Radio Frequency IDentification (RFID) system, and more particularly to data modulation/demodulation for high-speed data transmission from a reader to a tag.

2. Description of the Related Art

In general, Radio Frequency IDentification (RFID) is a technology that reads out or records information using wireless frequencies in a contactless manner from tags having unique identification information in order to identify, track and manage products, animals, or people attached with tags. An RFID system consists of a plurality of electronic tags or transponders (hereinafter referred to as 'tags') having unique identification information and attached to products and animals, and an RFID reader (hereinafter referred to a 'reader' or an 'interrogator') for reading and writing information.

A passive RFID system is a system in which a tag having information of an object does not have an apparatus for power and wireless signal transmission. The passive RFID system is enabled to provide information of each object and may be applied in more fields and industries compared to barcodes. RFID is used in a variety of applications to recognize an individual unit only using a tag ID. Recently, in the aircraft, automobile, shipbuilding, and steel industries, a technology for high-speed reading/writing large data using tag user memory greater than 32 Kbyte or 64 Kbyte is required for management and maintenance of components. However, the conventional passive RFID technology is not enough to implement the above task, and thus, it is necessary to develop a technology that allows high-speed transmission and receipt of data through communication between readers and tags.

A reader in the passive RFID system transmits data to a tag by using Pulse-Interval Encoding (PIE) defined in ISO/IEC 18000-63. However, the maximum data transmission rate of PIE is merely 128 Kbps which is not suitable for high-speed transmission and receipt of large data. For example, if a user wants to write large data in a tag with a reader, the reader needs to include data to be stored in a tag memory and an address thereof in a write command of the reader. In this case, if data to be written is large, it is necessary to divide the data and transmit a write command to a tag repeatedly. For this reason, a technology of transmitting data from a reader to a tag at high speed is required. In addition, if a user reads large data from a tag using a reader command of a reader, an error rate of a received data packet may increase, and thus, it is necessary to divide the data and transmit a read command to the tag repeatedly. Even in this case, a technology of transmitting data from the reader to the tag at high speed is required. In addition, given the fact that a tag operates passively, encoding data transmitted from a reader should have a simple structure.

SUMMARY

The following description relates to a passive Radio Frequency IDentification (RFID) reader for enhancing speed of data transmission from the RFID reader to an RFID tag, a passive RFID tag, and transmitting and receiving methods using extended Pulse-Interval Encoding (PIE).

The following description relates to a passive RFID reader that transmits data to be encoding, which has a simple structure, a passive RFID tag, and transmitting and receiving methods using extended PIE.

In one general aspect, there is provided a transmitting method using extended Pulse-Interval Encoding (PIE) in a Radio Frequency IDentification (RFID) system, including: configuring a transmitted frame including data to be transmitted to an RFID tag; and encoding the data in the transmitted frame by two bits in one symbol section, wherein the encoding includes: adjusting a length of a symbol according to a value of a first bit of 2-bit data to be encoded in each symbol section; and adjusting a length of an energy transfer waiting section according to a value of a second bit of 2-bit data to be encoded in each symbol section.

In another general aspect, there is provided a receiving method using Pulse-Interval Encoding (PIE) in a Radio Frequency IDentification (RFID) system, including: decoding a receiving signal from an RFID reader by two bits in each symbol section; and configuring a received frame from received data generated by the decoding, wherein the decoding includes: determining a first bit of the received data according to a length of a symbol of the received signal; and determining a second bit of the received data according to a length of an energy transfer waiting section of the received signal.

In still another general aspect, there is provided a passive Radio Frequency IDentification (RFID) reader including: a transmitted frame configuring component configured to configure a transmitted frame including data to be transmitted to an RFID tag; and an encoder configured to encode transmitted data of at least two bits in the transmitted frame by two bits in one symbol section, wherein the encoder is further configured to comprise: a symbol length adjuster configured to adjust a length of a symbol according to a value of a first bit of 2-bit data to be encoded in each symbol section; and an energy transfer waiting section length adjuster configured to adjust a length of an energy transfer waiting section length according to a value of a second bit of the 2-bit data to be encoded in each symbol section.

In yet another general aspect, there is provided a passive Radio Frequency IDentification (RFID) tag using Pulse-Interval Encoding (PIE), including: a decoder configured to decode a signal received from an RFID reader by two bits in each symbol section; and a received frame configuring component configured to configure a received frame from received data generated by the decoding, wherein the decoder is further configured to comprise: a first bit determiner configured to determine a first bit of the received data according to a length of a symbol of the received signal; and a second bit determiner configured to determine a second bit of the received data according to a length of an energy transfer waiting section of the received signal.

The present disclosure has an advantage in improving a transmission rate of an RFID reader while meeting physical constraints of a passive RFID tag and being compatible with an existing RFID system.

In addition, the present disclosure may improve a transmission rate of an existing RFID reader up to twice, and thus, may be utilized in a high-speed transmission system. Further, the present disclosure is able to be compatible with an existing passive RFID technology.

Other features and aspects may be apparent from the following detailed description, the drawings, and the claims.

BRIEF DESCRIPTION OF THE DRAWINGS

FIG. 1C is a table showing of Tari values and PW standards, which are defined in ISO/IEC 18000-63.

FIG. 3B is a diagram for explanation of cyclical redundancy check (CRC) computation in accordance with extended PIE according to an exemplary embodiment.

FIGS. 5A, 5B, and 5C are flowcharts for explanation of a receiving method using extended PIE according to an exemplary embodiment.

Figure 1A:
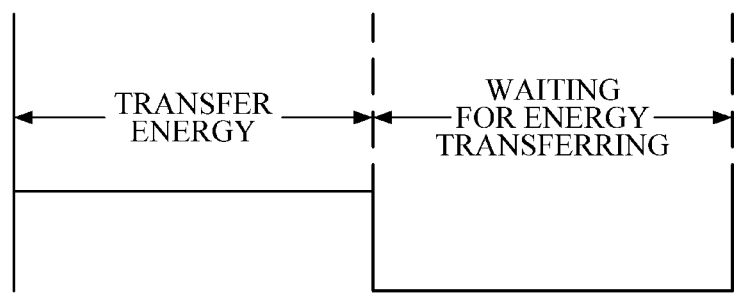
FIG. 1A is a diagram illustrating a method for energy transmission according to a signal level.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1A is a diagram illustrating a method for energy transmission according to a signal level.

Referring to FIG. 1A, the method for energy transmission according to a signal level consist of an energy transfer section, that is a high section where energy is being transferred, and an energy transfer waiting section, that is, a low PW section where energy is not being transferred.

Figure 1B:
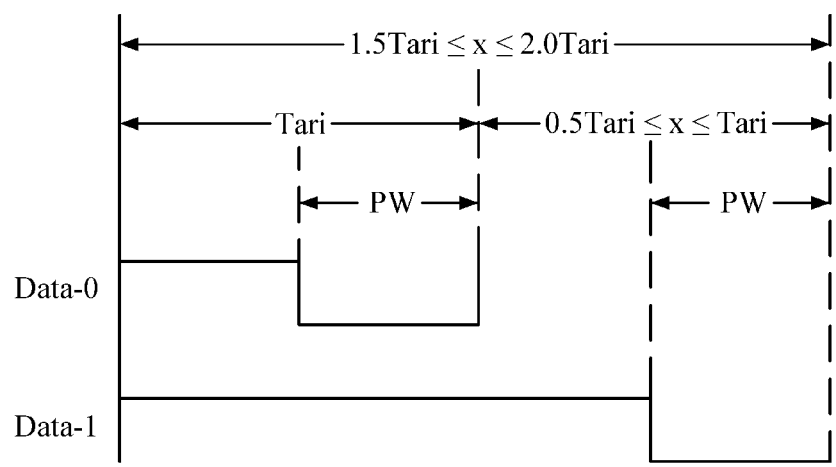
FIG. 1B is a diagram illustrating a data encoding method of ISO/IEC 18000-63.

FIG. 1B is a diagram illustrating a pulse-interval encoding (PIE) signal transmitted from a reader to a tag, which is generated according to physical requirements specified by ISO/IEC 18000-63.

Referring to FIG. 1B, the PIE method allows transmission of 1 bit of "0" or "1" at once. The method makes "0" and "1" distinguished from each other by setting a length of an energy transfer section differently. Herein, the symbol "Tari" denotes a reference time interval of a signal transmitted to the tag "Tari", and has a numeric value from 6.25 µs to 25 µs according to the values defined in FIG. 1C. In addition, the symbol "TW" denotes a pulse width of a selection section of an orthogonal component signal, and is desirably located within a range of 30%~50% of a pulse of an RF encoding signal. That is, data-o is encoded by separating a high section, where energy is being transferred, and a low PW section, where energy is not being transferred, and adjusting a Pulse Width (PW) to make the sum of the two sections 1 Tari, and then a signal is transmitted from a reader to a tag. In addition, data-1 is encoded by allocating an energy transfer section longer than that of data-0 and having the end attached with a low PW of the same length as that of data-0.

As such, PIE according to ISO.IEC 18000-63 shown in FIGS. 1A, 1B and 1C, transmits 1-bit information with a different length of period of time for transferring high energy, while using the energy transfer waiting section PW only as a signal that notifies completion of transmission. However, this method enables transmission of only 1-bit data.

In this present disclosure, extended PIE is proposed, which enables transmitting 2-bit data, compared to the conventional PIE method enabled to transmit only 1-bit data. That is, the PIE method according to the present disclosure enables transmission of 2-bit data with the first bit, which is configured by adjusting a length of a symbol of a transmitted signal, and the second bit which is configured by adjusting a length of an energy transfer waiting section of the transmitted signal. Herein, a symbol refers to a combined section of an energy transfer section and an energy transfer waiting section.

Figure 2A:
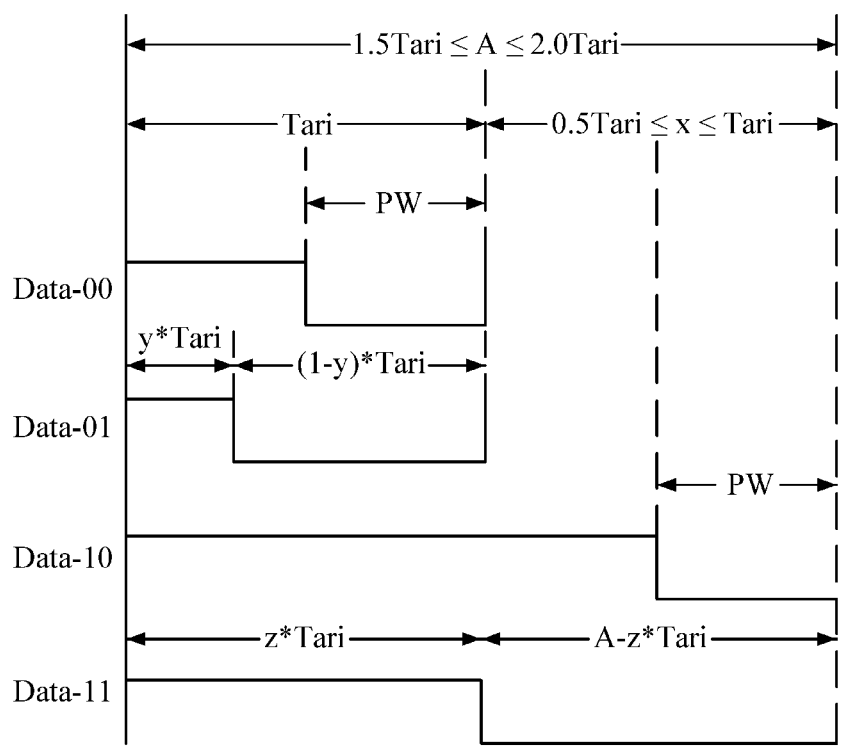
FIG. 2A is a diagram for explanation of extended Pulse-Interval Encoding (PIE) according to an exemplary embodiment.

FIG. 2A is a diagram for explanation of extended PIE within in a Radio Frequency IDentification (RFID) reader according to an exemplary embodiment.

Referring to FIG. 2A, Data-00 and Data-01, each having the first bit of "0", has a short symbol length, while Data-10 and Data-11, each having the first bit of "1", has a long symbol length. For example, it is possible to configure Data-00 and Data-01, each having the first bit of '0', by adjusting a symbol length thereof to be 1 Tari, and to configure Data-10 and Data-11, each having the first bit '0', by adjusting a symbol length thereof to be greater than 1.5 Tari but less than 2 Tari. However, the above is merely exemplary, and aspects of the present disclosure are not limited thereto. That is, it is possible to configure Data-00 and Data-01, each having the first bit of '0', to have a longer symbol length, and to configure Data-10 and Data 11, each having the first bit of '1', to have a shorter symbol length. In addition, the symbol length may be adjusted to have a different value.

Meanwhile, Data-00 and Data-10, each having the second bit of '0', has a shorter energy transfer waiting section, and Data-01 and Data-11, each having the second bit of '1', has a longer energy transfer waiting section. However, the above is merely exemplary, and aspects of the present disclosure are not limited thereto. That is, Data-00 and Data-10, each having the second bit of '0', has a long length of an energy transfer waiting section, while Data-01 and Data 11, each having the second bit of '1', has a short length of an energy transfer waiting section. In addition, a length of the energy transfer waiting section may be adjusted to have a different value.

The extended PIE according to the present disclosure has an advantage in improving transmission rate up to twice while meeting requirements of the existing ISO/IEC 18000-63 standard. That is, if a PIE signal corresponding to the existing data-0 and data-1 is allocated with data-00 and data-10, data-01 is generated by adjusting an energy transfer waiting section of data-00, and data-11 is generated by adjusting an energy transfer waiting section of data-10, it is possible to be compatible with the existing RFID system.

Figure 2B:
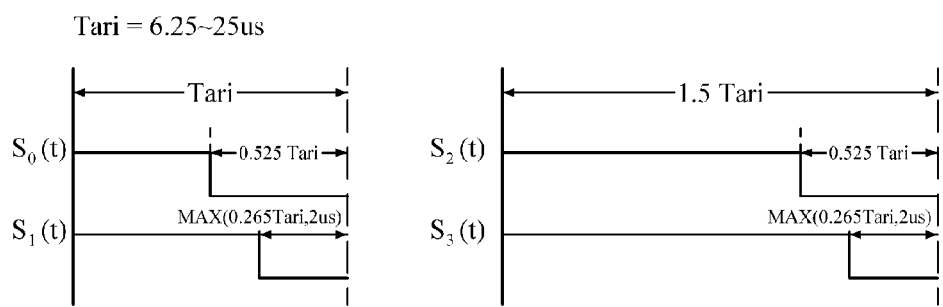
FIG. 2B is a diagram for explanation of a configuration of a symbol in accordance with extended PIE according to an exemplary embodiment.

FIG. 2B is a diagram for explanation of a symbol configuration led by extended PIE according to an exemplary embodiment.

Referring to FIG. 2B, a symbol length is determined to be 1 Tari in the case of data to be transmitted with the first bit of '0', that is, in the case of S0(t) and S1(t), while a symbol length is determined to be 1.5 Tari in the case of data to be transmitted with the first bit of '1', that is, in the case of S2(t) and S3(t). Herein, 6.25~25 us may be used as a value of 1 Tari. In addition, a length of an energy transfer waiting section is determined to be 0.525 Tari in the case of data to be transmitted with the second bit of '0', that is, in the case of S0(t) and S2(t), while a length of an energy transfer waiting section is determined to be MAX(0.265 Tari, 2 us) in the case of data to be transmitted with the second bit of '1', that is, in the case of S1(t) and S3(t).

Figure 2C:
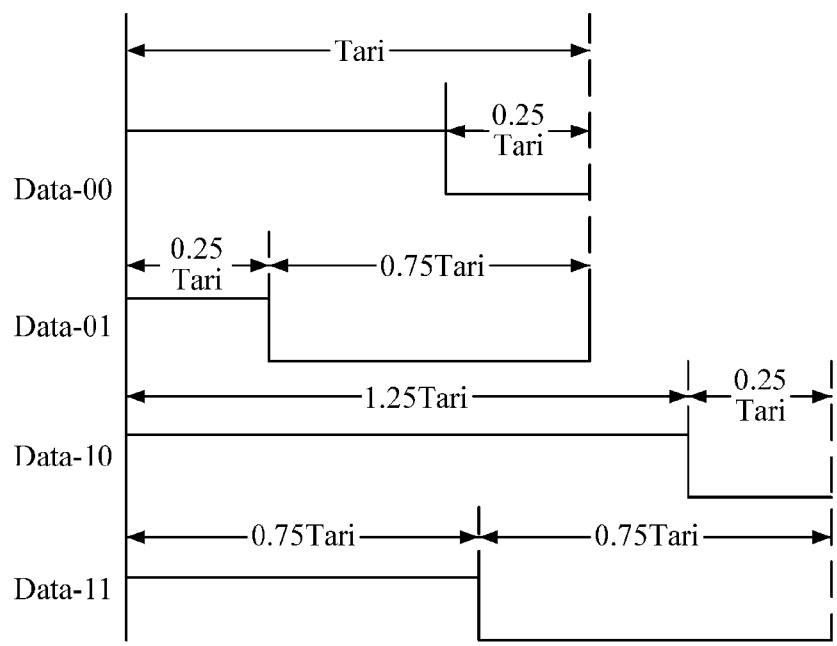
FIG. 2C is a diagram illustrating an example of extended PIE according to an exemplary embodiment.

FIG. 2C is a diagram for explanation of an example of an extended PIE method according to an exemplary embodiment.

Referring to FIG. 2C, symbol sections of MSB 1 bit is classified by 1 Tari and 1.5 Tari, and a short symbol section is allocated with bit '0' while a long symbol section is allocated with bit '1.' In addition, in a symbol section of 1 Tari, PW is divided into a section of 0.25 Tari and a section of 0.75 section, and an encoding signal with a short PW section is allocated with LSB bit of '0', while a long PW section is allocated with LSB bit '1.' Similarly, in a symbol section of 1.5 Tari, PW is divided into a section of 0.25 Tari and a section of 0.75 section, and an encoding signal with a short PW section is allocated with LSB bit of '0', while a long PW section is allocated with LSB bit '1.' Accordingly, two bits are allocated to each encoding signal so that it is possible to improve a transmission rate up to twice that of the existing method.

The above-described expended PIE according to the present disclosure transmits two bits per symbol, unlike the conventional PIE, and thus, it is necessary to define a value of an End-of-Signal that indicates whether the total number of bits of data to be transmitted is odd or even, the End-of-Signal which is transmitted from an RFID reader.

Figure 3A:
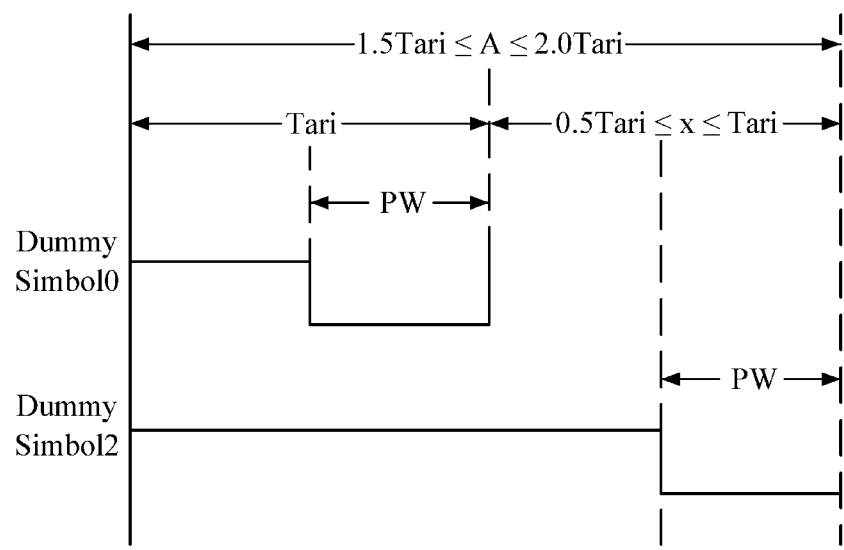
FIG. 3A is a diagram for explanation of a configuration of an End-of-Signal according to an exemplary embodiment.

FIG. 3A is a diagram for explanation of a symbol configuration of an End-of-signal according to an exemplary embodiment.

Referring to FIG. 3, Dummy symbol0 with an energy transfer section shorter than 1 Tari is used as an End-of-Signal that defines an odd number of bits, and Dummy symbol2 with an energy transfer section longer than 1 Tari is used as an End-of-Signal that defines an even number of bits. However, the above is merely exemplary, and aspects of the present disclosure are not limited thereto. That is, mapping of an End-of-signal symbol according to an odd or even number of bits may differ by an implementation method therefor.

In addition, the method for extended PIE encoding according to the present disclosure transmits two bits per symbol, and thus, is enable to transmit an even number of bits. For this reason, if the total number of bits of data to be transmitted is odd, it needs to add one dummy bit. Due to the dummy bit, the method for extended PIE encoding is required to implement a cyclical redundancy check (CRC) computation method that is different from the existing methods.

FIG. 3B is a diagram for explanation of CRC computation implemented according to the method for extended PIE encoding according to an exemplary embodiment.

Referring to FIG. 3B, n denotes the number of Payload bits, and m denotes the number of CRC bits. In FIG. 3B, there are descriptions about CRC computation with respect to values of n and m.

In the first case where n is odd and m is 16, the total number of bits of data to be transmitted is odd, so that CRC computation is implemented by adding dummy bit0 to the end of Payload, and a symbol is encoded by two bits and then transmitted using extended PIE according to the present disclosure. In addition, the End-of-Signal transmits symbol0 to indicate that the total number of bits of valid data, except any dummy bit, is odd, as illustrated in FIG. 3A.

In the second case where n is odd and m is 5, the total number of bits of data to be transmitted is even, so that dummy bit is unnecessary and the End-of-Signal uses symbolo2 indicative of the number of bits of valid data is even.

In third case where n is even and m is 16, dummy bit is unnecessary and the End-of-Signal uses symbol2 indicative of the number of bits of valid data, is even, similarly to the second case.

In the fourth case where n is even and m is 5, the total number of bits of valid data is odd, so that CRC computation is implemented by adding dummy bit0 to the end of Payload and the End-of-Signal uses symbol0.

Using 0 as dummy bit is merely exemplary, and aspects of the present disclosure are not limited thereto. That is, 1 may be used as dummy bit.

Figure 4A:
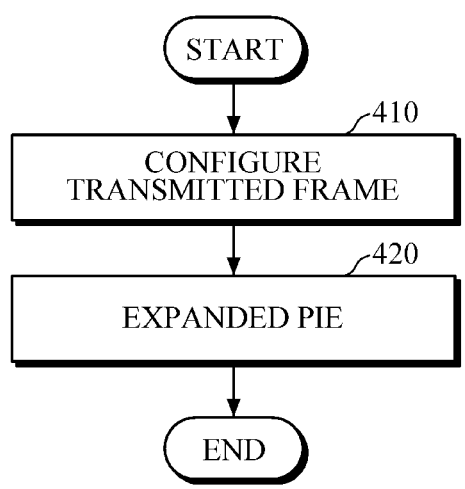
FIGS. 4A, 4B, and 4C are flowcharts for explanation of a transmitting method using extended PIE according to an exemplary embodiment.
Figure 4B:
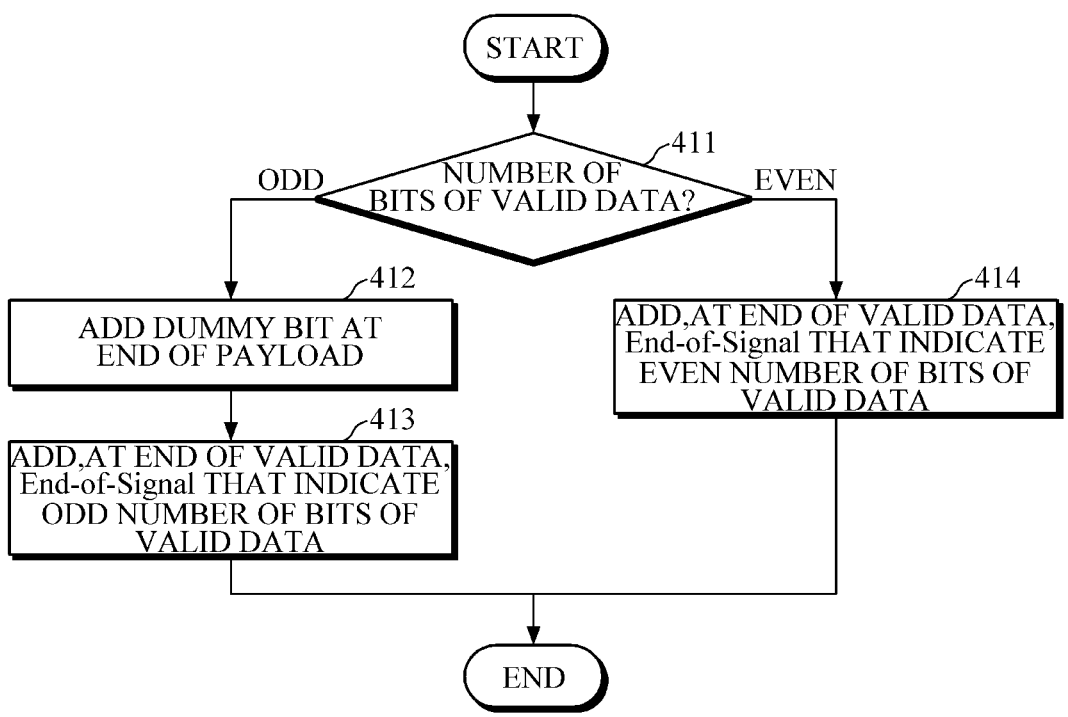
Figure 4C:
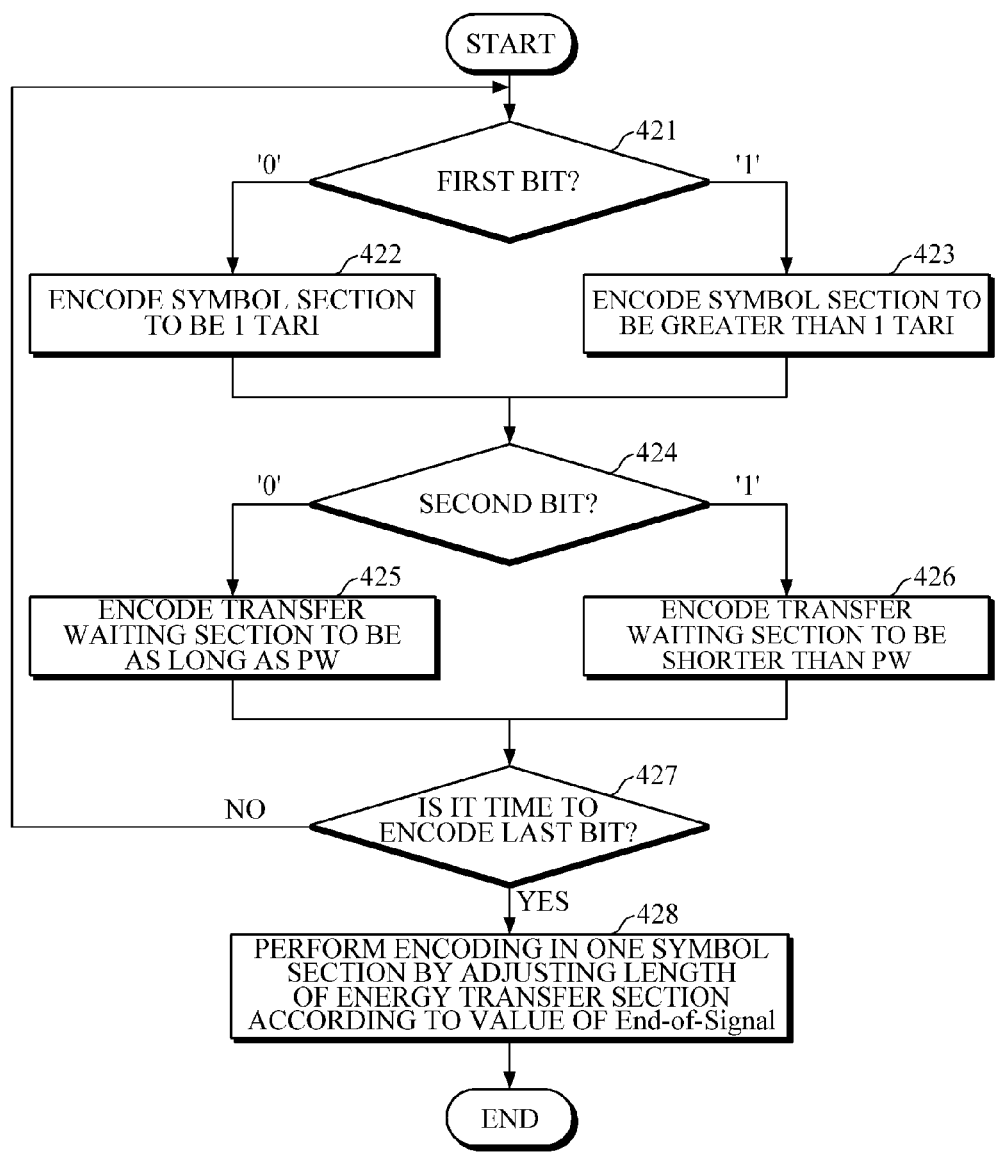

FIGS. 4A, 4B and 4C are flowcharts for explanation of a transmitting method using extended PIE encoding according to an exemplary embodiment. Referring to FIG. 4A, the transmitting method using extended PIE encoding includes configuring a transmitted frame including data to be transmitted in an RFID tag in 410, and encoding the transmitted data of at least two bits by two bits in one symbol section in 420.

FIG. 4B is a flowchart illustrating operation 410 in detail. In 411, a RFID reader determines whether the number of bits of valid data, which is the sum of the number of bits of a payload and the number of CRC bits, is odd.

If it is determined in 411 that the number of bits of valid data is odd, the RFID reader adds a dummy bit to the payload in 412, and adds an End-Of-Signaling bit indicative of an odd number of bits of valid data to the end of the valid data in 413.

Alternatively, if it is determined in 411 that the number of bits of valid data is even, the RFID reader adds an End-of-Signaling bit indicative of an even number of bits of valid data to the end of the valid data in 413.

FIG. 4C is a flowchart illustrating operation 430 in detail. When encoding data in the configured transmitted frame by two bits in one symbol section, the RFID reader determines whether the first bit of the 2-bit data to be transmitted to an RFID tag is '0' or '1' in 421. In response to the first bit being determined in 421 as '0', the RFID reader encodes a symbol length of a transmitted signal to be greater than 1 Tari in 423. For example, the RFID reader encodes a transmitted signal to be greater than 1.5 but less than 2 Tari.

Then, the RFID reader determines that the second bit of the 2-bit data to be transmitted to an RFID tag is '0' or '1' in 424. In response to the second bit being determined in 424 as '0', the RFID reader encodes a length of an energy transfer waiting section of a transmitted signal to be PW in 425. Alternatively, in response to the second bit being determined in 424 as '1', the RFID reader encodes a length of an energy transfer waiting section of a transmitted signal to be longer or shorter than PW in 426.

Data included in a transmitted data frame are encoded sequentially in accordance with operations 421 to 426, and the RFID reader determines whether it is time to encode the last bit in 427.

In response to a determination made in 427 that it is not time to encode the last bit, the RFID reader may proceed with operation 421 and encode the next two bits.

Alternatively, in response to a determination made in 427 that it is time to encode the last bit, the RFID reader performs encoding in one symbol section using the encoding method illustrated in FIG. 3A according to a value set in the End-of-Signaling bit in 428.

Figure 5A:
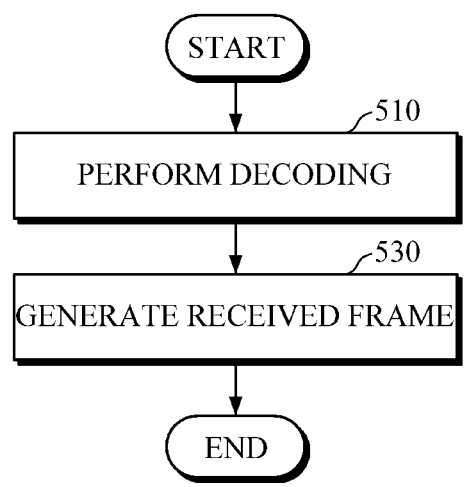
Figure 5C:
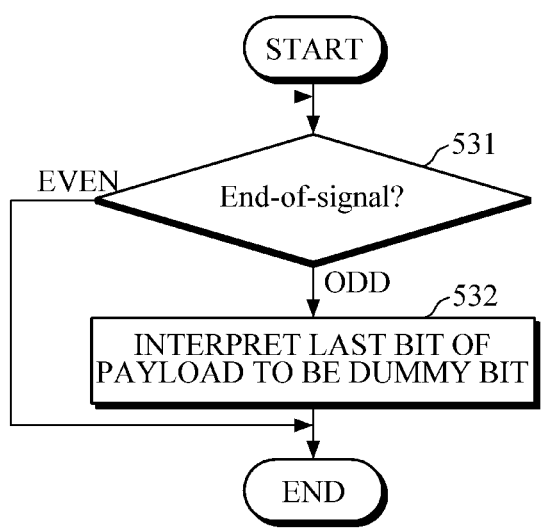

FIGS. 5A, 5B, and 5C are flowcharts for explanation of a receiving method using extended PIE decoding according to an exemplary embodiment.

Referring to FIG. 5A, the receiving method using extended PIE decoding includes decoding a received signal by two bits in each symbol section in 510, and configuring a received frame from decoded data in 530.

FIG. 5B is a flowchart illustrating operation 510. Referring to FIG. 5B, an RFID tag calculates an average symbol length of a received signal in 511. Then, the RFID tag determines whether a symbol length of each received signal is greater than the average symbol length in 512. In response to a determination made in 512 that a symbol length of a received signal is greater than the average symbol length, the RFID tag determines the first bit of data to be "0" in 513. Alternatively, in response to a determination made in 512 that a symbol length of a received signal is not greater than the average symbol length, the RFID tag determines the first bit of data to be '1' in 514.

The RFID tag calculates an average length of an energy transfer waiting section of received signals in 515. Then, the RFID tag determines whether a length of an energy transfer waiting section of each received signal is greater than the average length of energy transfer waiting sections in 516. In a case where the length of an energy transfer waiting section is determined in 516 to be greater than the average length of energy transfer waiting sections, the RFID tag determines the second bit of data to be '0' in 517. Alternatively, in response to the length of an energy transfer waiting section being determined in 516 not to be greater than the average length of energy transfer waiting sections, the RFID tag determines the second bit of data to be '1' in 518.

However, according to another embodiment of the present disclosure, the RFID tag may determine whether a length of an energy transfer waiting section of each received signal is less than the average length of energy transfer waiting sections. Then, the RFID tag may determine the second bit of data to be '0' in response to a determination that a length of an energy transfer waiting section is not greater than the average length of energy transfer waiting sections, while determining the second bit of data to be '1' in response to a determination that a length of the energy transfer waiting section' is greater than the average length of energy transfer waiting sections.

Data included in a transmitted data frame are encoded sequentially in accordance with operations 511 to 518, and the RFID tag determines whether it is time to decode the last bit in 519.

If it is determined in 519 that it is not time to decode the last bit, the RFID tag proceeds with operation 512. Alternatively, if it is determined in 519 that it is time to decode the last bit, the RFID tag decodes an End-of-Signaling bit, which is the last bit of a received signal, within one symbol section in 520. FIG. 5C illustrates operation 530 in detail. The RFID tag determines whether the number of bits of valid data, which is the sum of the number of bits of a payload and the number of CRC bits, is odd according to a value of an End-of-Signaling bit in 531.

If it is determined in 531 that the number of bits of valid data is odd, the RFID tag interprets the last bit of the payload to be a dummy bit in 532.

Figure 6:
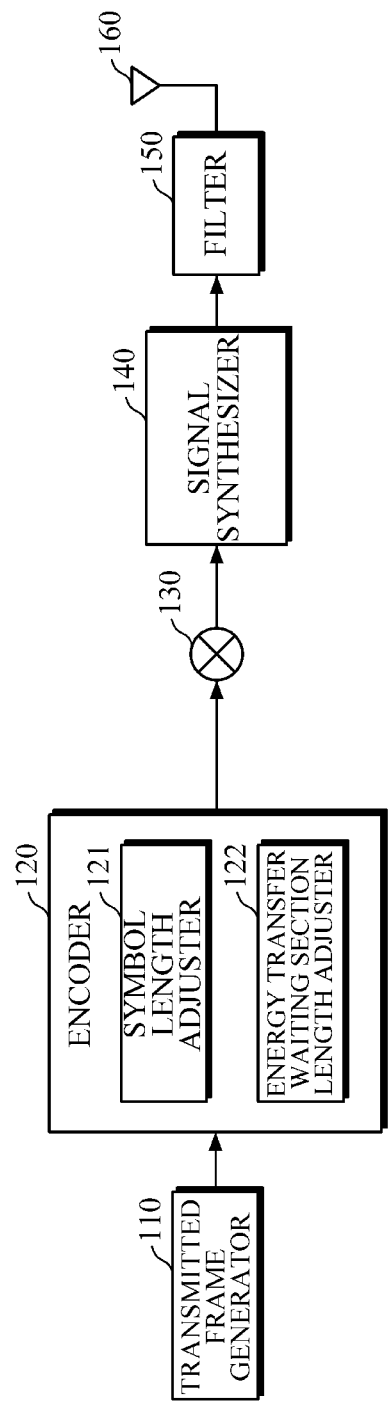
FIG. 6 is a diagram illustrating an inner configuration of a passive Radio Frequency IDentification (RFID) reader according to an exemplary embodiment.

FIG. 6 is a diagram illustrating an inner configuration of a passive RFID reader according to an exemplary embodiment.

Referring to FIG. 6, an RFID reader 100 according to an exemplary embodiment of the present disclosure includes a transmitted frame configuring component, an encoder 120, the first mixer 131, the second mixer 132, a signal synthesizer 140, a filter 150, and an antenna 160.

In addition, although not illustrated in FIG. 6, the RFID reader 100 further includes a controller that has a communication protocol to control wireless communication with a tag and may be implemented by a Field Programmable Gate Array (FPGA) circuit or a Digital Signal Processing (DSP) circuit which periodically transmits a signal for requesting information in order to identify a location of the tag. A digital signal processed by the controller consists of two separate orthogonal component signals, such as an I (In-phase) signal and a Q (Quadrature-phase) signal, and a size of the digital signal is represented by a phase function.

The transmitted frame configuring component 110 configures a transmitted frame including data to be transmitted to an RFID tag. Specifically, in a case where the number of bits of valid data, which is the sum of the bits of a payload and the number of CRC bits, is odd, the transmitted frame configuring component 110 adds a dummy bit to the payload. In addition, the transmitted frame configuring component 110 adds an End-of-Signaling bit that indicates that the number of bits of valid data is odd or even.

To encode an orthogonal digital signal into an analog signal, the encoder 120 includes an encoding circuit, such as a Digital to Analog Converter (DAC). The encoder 120 performs encoding according to PIE signal requirements based on UHF RFID Protocol, such as ISO/IEC 18000-61, ISO/IEC 18000-62, and ISO/IEC 18000-63. The extended PIE encoding method according to the present disclosure enables transmitting data by two bits by adjusting a symbol length of a transmitted signal to configure the first bit and adjusting a length of an energy transfer waiting section to configure the second bit. That is, the encoder 120 includes a symbol length adjuster 121 configured to adjust a length of a symbol according to a value of the first bit of transmitted data, and an energy transfer waiting section length adjuster 122 configured to adjust a length of an energy transfer waiting section according to a value of the second bit of the transmitted data. For example, the symbol length adjuster 121 adjusts Data-00 and Data-01, each having the first bit of '0', to be 1 Tari, and Data-10 and Data 11, each having the first bit of '1' 1 to be greater than 1.5 Tari but less than 2 Tari. However, the above is merely exemplary, and aspects of the present disclosure are not limited thereto. That is, Data-00 and Data-01, each having the first bit of '0' may be configured to have a long length, while Data-10 and Data-11, each having the first bit of '1', may be configured to have a short length. In addition, the symbol length may be adjusted to be a different value.

The energy transfer waiting section length adjuster 122 adjusts Data-00 and Data-10, each having the second bit of '0', to have a short energy transfer waiting section, and Data-01 and Data 11, each having the second bit of '1', to have a long energy transfer waiting section. For example, the energy transfer waiting section is configured to have a length of an energy transfer waiting section to be as long as PW or longer than PW. However, the above is merely exemplary, and aspects of the present disclosure are not limited thereto. That is, Data-00 and Data-01, each having the second bit of '0' may be configured to have a long length of an energy transfer waiting section, while Data-10 and Data-11, each having the second bit of '1', may be configured to have a short length of an energy transfer waiting section. In addition, a length of the energy transfer waiting section may be adjusted to be a different value.

That is, a symbol length is determined to be 1 Tari in the case of data to be transmitted with the first bit of '0', that is, in the case of S0(t) and S1(t), while a symbol length is determined to be 1.5 Tari in the case of data to be transmitted with the first bit of '1', that is, in the case of S2(t) and S3(t). Herein, a value of 1 Tari may be between 6.25 us and 25 us. In addition, a length of an energy transfer waiting section is determined as 6.25~25 us in the case of data to be transmitted with the second bit of '0', that is, in the case of S0(t) and S2(t), while a length of an energy transfer waiting section is determined as MAX(0.265 Tari, 2 us) in the case of data to be transmitted with the second bit of '1', that is, in the case of S1(t) and S3(t).

In addition, the encoder 120 encodes valid data by two bits, and encodes the End-of-Signaling bit in one symbol section.

The mixer 130 mixes the encoded baseband signal, that is, a baseband signal, with an oscillation frequency signal generated by a phase locked loop (not shown), and converts the mixed signal into an RF signal.

In order to remove noise, the signal synthesizer 140 transmits noise components of each RF signal, transmitted from the mixer 130, to the filter 150 which may be a band pass filter, such as a Surface Acoustic Wave (SAW) filter. An RF signal is transmitted to a tag through the antenna 160.

Figure 7:
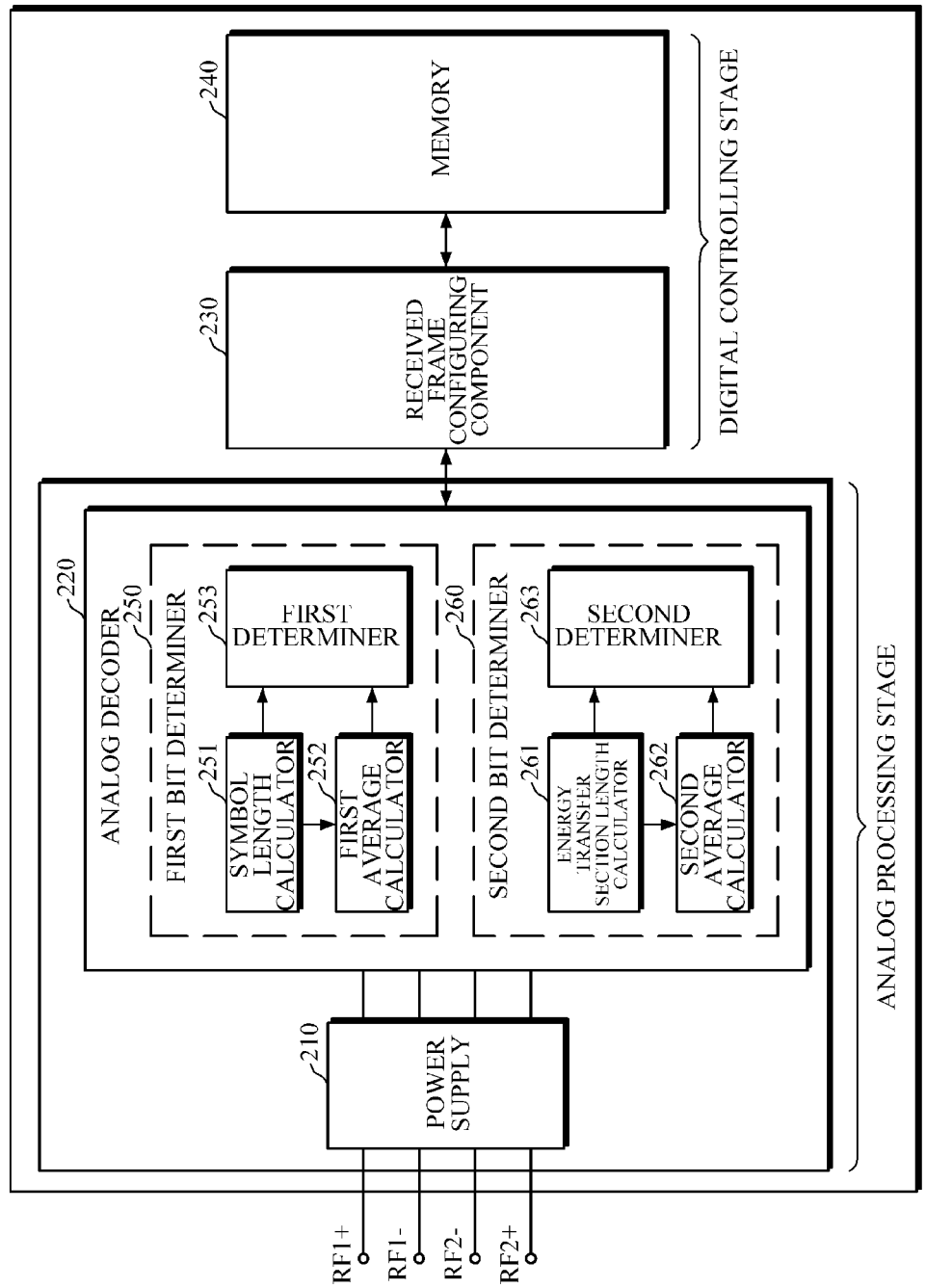
FIG. 7 is a diagram illustrating an inner configuration of a passive RFID tag according to an exemplary embodiment.

FIG. 7 is a diagram illustrating an inner configuration of a passive RFID tag according to an exemplary embodiment.

Referring to FIG. 7, a passive RFID tag according to an exemplary embodiment consists of an analog processing stage and a digital controlling stage, wherein the analog processing stage includes an antenna (not shown), a power supply 210 and an analog decoder 220, the digital controlling stage includes a received frame configuring component 230 and a memory 240. A reader CW signal received through the antenna is converted by the analog decoder 220 into a digital signal using envelop detection.

In addition, although not illustrated in FIG. 7, the RFID tag further includes a controller that analyzes a received digital signal to analyze a command from a reader, has a communication protocol to control wireless communication with the reader, and controlling transmission of a tag response signal in response to a request from the reader.

The analog decoder 220 decodes a received signal by two bits in each symbol section. Specifically, the analog decoder 220 includes the first bit determiner 250 and the second bit determiner 260, wherein the first bit determiner 250 determines the first bit of received data according to a symbol length of the received signal, and the second bit determiner 260 determines the second bit of the received data according to a length of an energy transfer waiting section of the received signal.

The first bit determiner 250 includes: a symbol length calculator 251 configured to calculate a symbol length of a received signal; the first average calculator 252 configured to calculate an average symbol length of two or more received signals; and the first determiner 253 configured to determine a value of the first bit according to whether the symbol length of a received signal is greater than the average symbol length.

The second bit determiner 260 includes: an energy transfer waiting section length calculator 261 configured to calculate a length of an energy transfer waiting section of a received signal; the second average calculator 262 configured to calculate an average length of energy transfer waiting sections of two or more received signals; and the second determiner 260 configured to determines a value of the second bit by determining as to whether the length of the energy transfer waiting section of the received signal is greater than the average length of energy transfer waiting sections of two or more received signals. According to another exemplary embodiment of the present disclosure, in response to a determination that a length of an energy transfer waiting section of a received signal is not greater than the average length of energy transfer waiting sections, the determiner 260 may determine the second bit of data to be '0'. Alternatively, in response to a determination that the length of an energy transfer waiting section of a received signal is greater than the average length of energy transfer waiting sections, the determiner 260 may determine the second bit of data to be '1.'

In addition, the analog decoder 220 decodes an End-of-Signaling bit, which is the last bit of a received signal, in one symbol section. In a case where the number of bits of valid data, which is the sum of the number of bits of a payload and the number of CRC bits, is odd according to a value of the End-of-Signaling bit, the received frame configuring component 230 interprets the last bit of the payload to be a dummy bit.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmitting method using extended Pulse-Interval Encoding (PIE) in a Radio Frequency IDentification (RFID) system, comprising:
    configuring a transmitted frame including data to be transmitted to an RFID tag; and
    encoding the data in the transmitted frame by two bits in one symbol section,
    wherein the encoding comprises:
        adjusting a length of a symbol according to a value of a first bit of 2-bit data to be encoded in each symbol section; and
        adjusting a length of an energy transfer waiting section according to a value of a second bit of 2-bit data to be encoded in each symbol section.

2. The transmitting method of claim 1, wherein the adjusting of a length of a symbol comprises determining the length of the symbol to be 1 Tari, or to be greater than 1.5 Tari but less than 2 Tari.

3. The transmitting method of claim 2,
    wherein the value of 1 Tari is between 6.25 us and 25 us, and the length of a symbol is determined to be 1 Tari in response to the first bit of '0', and to be 1.5 Tari in response to the first bit of '1',
    wherein the adjusting of the length of an energy transfer waiting section comprises:
        in response to the second bit of '0', determining a length of the energy transfer waiting section as 0.525; and in response to the second bit of '1', determining a length of the energy transfer waiting section as MAX(0.265 Tari, 2 us).

4. The transmitting method of claim 1, wherein the adjusting of a length of an energy transfer waiting section comprises configuring the energy transfer waiting section to be as long as Pulse Width (PW) or longer or shorter than PW.

5. The method of claim 1, wherein the configuring of a transmitted frame comprises:
   determining whether a number of bits of valid data, which is a sum of a number of bits of a payload and a number of cyclical redundancy check (CRC) bits, is odd; and
   in response to a determination that the number of bits of valid data is odd, adding a dummy bit to the payload.

6. The method of claim 1,
   wherein the configuring of a transmitted frame comprises:
      determining whether a number of bits of valid data, which is a sum of a number of bits of a payload and a number of CRC bits, is odd or even; and
      adding an End-Of-Signaling bit that indicates a determination as to whether the number of bits of valid data is odd or even,
   wherein the encoding further comprises encoding the valid data by two bits and encoding the End-of-Signaling bit in one symbol section.

7. A receiving method using Pulse-Interval Encoding (PIE) in a Radio Frequency IDentification (RFID) system, comprising:
   decoding a receiving signal from an RFID reader by two bits in each symbol section; and
   configuring a received frame from received data generated by the decoding,
   wherein the decoding comprises:
      determining a first bit of the received data according to a length of a symbol of the received signal; and
      determining a second bit of the received data according to a length of an energy transfer waiting section of the received signal.

8. The receiving method of claim 7, wherein the determining of a first bit comprises:
   calculating an average length of symbols of two or more received signals;
   determining whether a length of the symbol of the received signal is longer than the average length of symbols; and
   determining a value of the first bit of the received data according to a determination as to whether a length of the symbol of the received signal is longer than the average length of symbols.

9. The receiving method of claim 8, wherein the determining of a second bit comprises:
   calculating an average length of energy transfer waiting sections of two or more receiving signals;
   determining whether the length of the energy transfer waiting section of the received signal is greater or smaller than the average length of energy transfer waiting sections; and
   determining a value of the second bit according to a determination as to length of the energy transfer waiting section of the received signal is greater or smaller than the average length of energy transfer waiting sections.

10. The receiving method of claim 7,
    wherein the decoding further comprises an End-of-Signaling bit, which is a last bit of the received signal, in one symbol section,
    wherein the configuring of the received frame comprises:
       determining whether a number of bits of valid data, which is a sum of a number of bits of a payload and a number of cyclical redundancy check (CRC) bits, is odd according to a value of the End-of-Signaling bit; and
       in response to a determination that the number of bits of valid data is odd, interpreting the last bit of the payload to be an dummy bit.

11. A passive Radio Frequency IDentification (RFID) reader comprising:
    a transmitted frame configuring component configured to configure a transmitted frame including data to be transmitted to an RFID tag; and
    an encoder configured to encode transmitted data of at least two bits in the transmitted frame by two bits in one symbol section,
    wherein the encoder is further configured to comprise:
       a symbol length adjuster configured to adjust a length of a symbol according to a value of a first bit of 2-bit data to be encoded in each symbol section; and
       an energy transfer waiting section length adjuster configured to adjust a length of an energy transfer waiting section length according to a value of a second bit of the 2-bit data to be encoded in each symbol section.

12. The passive RFID reader of claim 11, wherein the symbol length adjuster is further configured to configure the length of a symbol according to the value of the first bit to be 1 Tari, or to be greater than 1.5 Tari but less than 2 Tari.

13. The passive RFID reader of claim 11, wherein the energy transfer waiting section length adjuster is further configured to configure the energy transfer waiting section to be as long as Pulse Width (PW) or to be longer or shorter than PW.

14. The passive RFID reader of claim 12,
    wherein a value of 1 Tari is used between 6.25 us and 25 us,
    wherein the symbol length adjuster is further configured to:
       in response to the transmitted data with the first bit of '0', determine the length of a symbol to be ' Tari; and
       in response to the transmitted data with the first bit of '1', determine the length of a symbol to be 1.5 Tari,
    wherein the energy transfer waiting section length adjuster is further configured to:
       in response to the transmitted data with the second bit of '0', determine the length of the energy transfer waiting section to be 0.525 Tari; and
       in response to the transmitted data with the second bit of '1', determine the length of the energy transfer waiting section to be MAX(0.265 Tari, 2 us).

15. The passive RFID reader of claim 11, wherein the transmitted frame configuring component is further configured to add a dummy bit to a payload in a case where a number of bits of valid data, which is a sum of a number of bits of the payload and a number of cyclical redundancy check (CRC) bits, is odd.

16. The passive RFID reader of claim 11,
    wherein the transmitted frame configuring component is further configured to add an End-of-Signaling bit that indicates whether where a number of bits of valid data, which is a sum of a number of bits of a payload and a number of CRC bits, is odd,
    wherein the encoder is further configured to, encoding the valid data by two bits and encoding the End-of-Signaling bit in one symbol section.

17. A passive Radio Frequency IDentification (RFID) tag using Pulse-Interval Encoding (PIE), comprising:
    a decoder configured to decode a signal received from an RFID reader by two bits in each symbol section; and a received frame configuring component configured to configure a received frame from received data generated by the decoding, wherein the decoder is further configured to comprise:

a first bit determiner configured to determine a first bit of the received data according to a length of a symbol of the received signal; and a second bit determiner configured to determine a second bit of the received data according to a length of an energy transfer waiting section of the received signal.

18. The passive RFID tag of claim 17, wherein the first bit determiner is further configured to comprise:

a symbol length calculator configured to calculate the length of the symbol of the received signal;

a first average calculator configured to calculate an average length of symbols of two or more received signals; and a first determiner configured to determine a value of the first bit according to a determination as to whether the length of the symbol of the received signal is greater than the average length of symbols of the two or more received signals.

19. The passive RFID tag of claim 17, wherein the second bit determiner is further configured to comprise:

an energy transfer waiting section length calculator configured to calculate the length of the energy transfer waiting section of the received signal;

a second average calculator configured to calculate an average length of energy transfer waiting sections of two or more received signals; and a second determiner configured to determine a value of the second bit by determining as to whether the length of the energy transfer waiting section of the received signal is greater than the average length of energy transfer waiting sections of the two or more received signals.

20. The passive RFID tag of claim 17, wherein the decoder is further configured to decode an End-of-Signaling bit, which is a last bit of the received signal, in one symbol section, wherein the received frame configuring component is further configured to interpret a last bit of a payload to be a dummy bit in a case where a number of bits of valid data, which is a sum of a number of bits of the payload and a number of CRC bits, is odd.

\* \* \* \* \*